(No Model.) 2 Sheets—Sheet 2.

J. W. BOWLEY.
ICE CREAM FREEZER.

No. 493,966. Patented Mar. 21, 1893.

Witnesses
J. K. Ingham
Charles E. Brougham.

Inventor
J. W. Bowley

UNITED STATES PATENT OFFICE.

JOSEPH WILFRED BOWLEY, OF LONDON, ENGLAND.

ICE-CREAM FREEZER.

SPECIFICATION forming part of Letters Patent No. 493,966, dated March 21, 1893.

Application filed June 27, 1892. Serial No. 438,141. (No model.)

*To all whom it may concern:*

Be it known that I, JOSEPH WILFRED BOWLEY, a subject of the Queen of Great Britain and Ireland, residing at Tooting, London, in the county of Surrey, England, have invented Improvements in Refrigerating and Ice-Making Machines, of which the following is a specification.

This invention has reference to a simple inexpensive construction and arrangement of refrigerating and ice making machines (hereinafter called a refrigerating machine) whereby materials to produce ice cream or other liquids or substances can be cooled or frozen in a rapid and convenient manner. According thereto the refrigerating machine comprises a vessel adapted to hold a freezing or cooling agent, a passage arranged within or around the said vessel so as to be cooled by such freezing or cooling agent and provided with inlet and outlet openings for material to be cooled or frozen, a screw conveyer mounted to rotate within the said passage, and means for rotating the said screw conveyer, the arrangement being such that when the machine is in action, material fed into the passage will be caused by the screw conveyer to travel through the said passage wherein it will become speedily cooled or frozen. In order that the screw conveyer shall not become frozen in place when the machine is not in operation, the said vessel and screw conveyer are so mounted and arranged in relation to each other that the one can be readily removed from the other.

Figure 1:
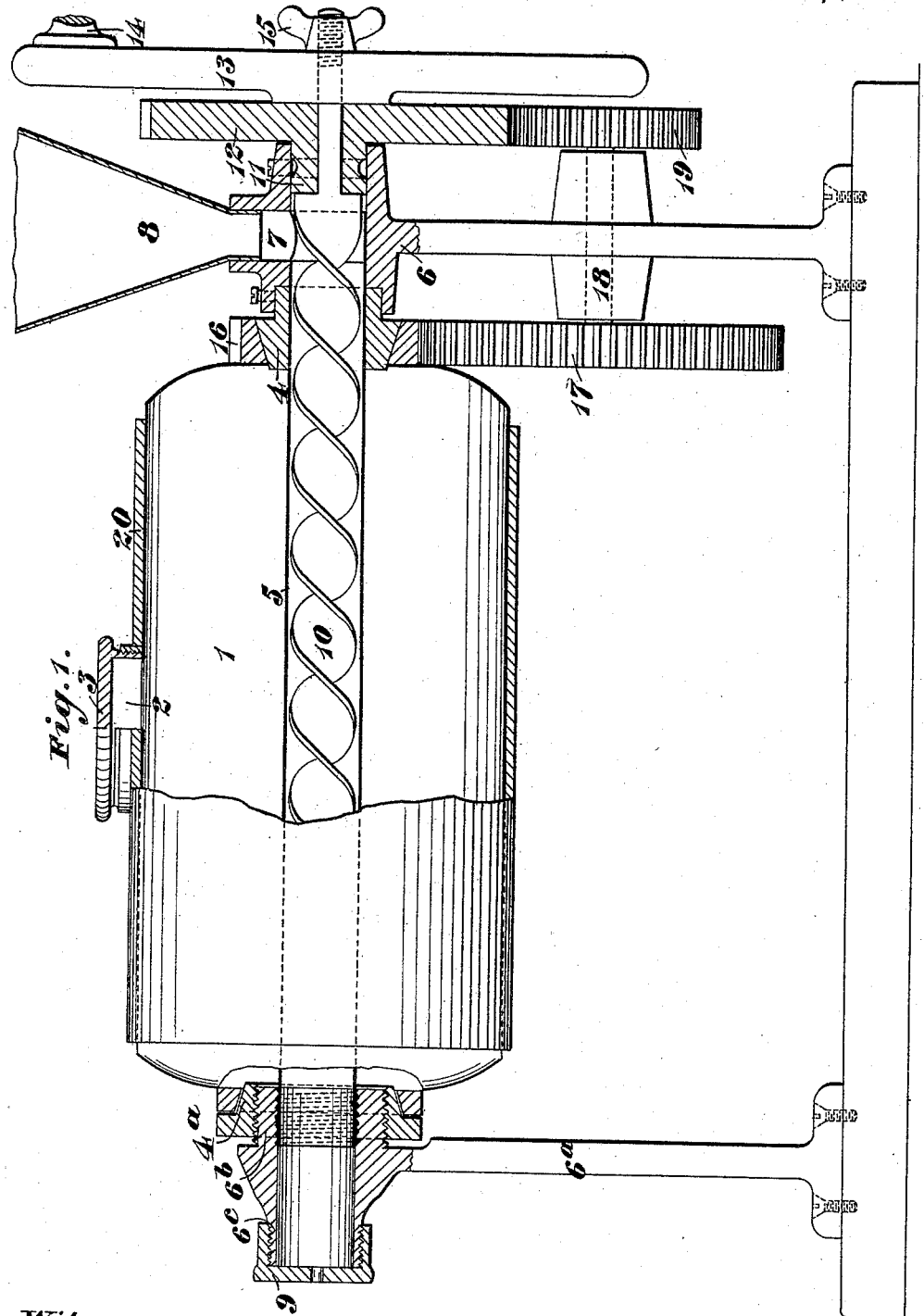
Figure 2:
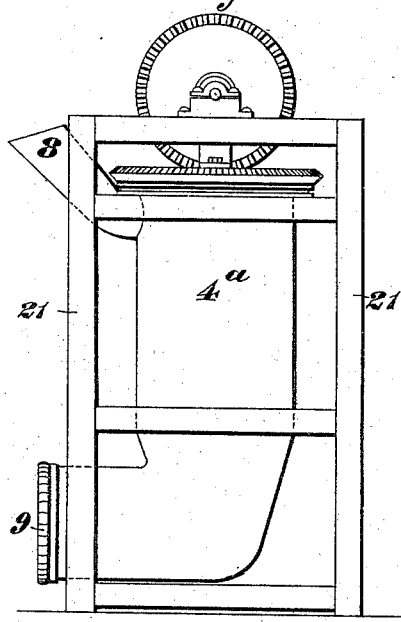
Figure 3:
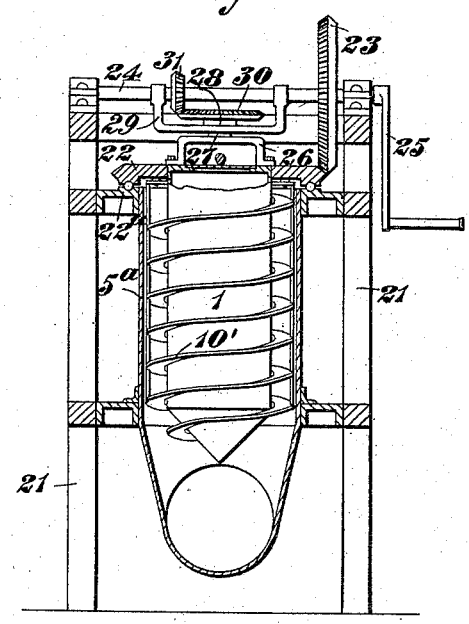
Figure 4:
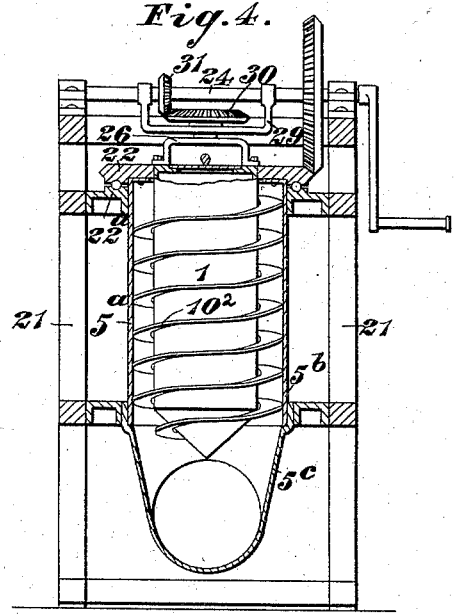

In the accompanying drawings, Figure 1 shows partly in side elevation and partly in longitudinal vertical section, a refrigerating machine constructed according to this invention. Fig. 2 is a side elevation; and Fig. 3 a sectional elevation illustrating a modified construction of refrigerating machine according to this invention. Fig. 4 is a similar view to Fig. 3 illustrating a further modified construction.

Referring to Fig. 1, 1 is a cylindrical vessel to contain the freezing agent, for example a mixture of ice and salt, that is to be used for cooling or freezing the liquid or other material to be cooled and which agent is introduced through a charging opening 2 normally closed by a cover or lid 3. The vessel is mounted at its ends to rotate upon cone bearings 4, 4$^a$ one of which (4) is fixed upon a cylindrical tube 5 that extends centrally through the vessel and the ends of which are fixed within standards 6, 6$^a$. The other cone bearing namely 4$^a$, is screwed upon a hollow extension 6$^b$ of the standard 6$^a$ so that it can be adjusted toward the vessel to compensate for wear. The tube 5 is formed at one end with an inlet opening 7 above which is a funnel or hopper 8 for feeding the material to be frozen. The other end of the tube 5 is open and is secured in the hollow extension 6$^b$ of the standard 6$^a$, which is provided with a second hollow externally screw threaded extension 6$^c$. To this extension may be attached a perforated screw cap or cover 9 to prevent the liquid to be frozen, flowing too rapidly through the tube 5 when first starting the machine to work. After the material has become frozen, the cap or cover 9 is removed and may be replaced by a mold into which the frozen material can be forced.

10 is a screw conveyer mounted to rotate within the tube 5 and consisting in the example shown of a flat metal bar twisted to form a spiral screw blade of uniform pitch. As will be obvious however, the screw conveyer may be constructed in various ways, the screw blade or blades being of uniform or irregular pitch and either continuous or broken. The screw conveyer at one end extends through the otherwise closed end of the tube 5 and enters a transverse slot in a cylindrical extension 11 of a toothed wheel 12 to which and a fly wheel 13 with handle 14 it is fixed by means of a nut 15. The arrangement is such that by removing the nut 15 the screw conveyer can be readily withdrawn from the tube 5 through the hollow extension 6$^c$ of the standard 6$^a$. To the vessel 1 is fixed a toothed wheel 16 that gears with a toothed wheel 17 fixed upon a shaft 18 to which is fixed a toothed wheel 19 that is in gear with the toothed wheel 12.

20 is a layer of non-conducting material, as for example felt, inclosing the vessel 1 to protect this vessel from external heat.

With the arrangement described it will be seen that assuming the vessel 1 to be charged with a freezing agent, and liquid be fed to the tube 5, then if the fly wheel 13 be rotated, the vessel 1 and screw conveyer 10 will be rotated independently of each other and at different speeds, the material will become frozen by contact with the tube 5 through which it will be forced by the screw conveyer, and the freezing agent in the vessel 1 will be thoroughly agitated so that fresh portions thereof will be constantly brought into contact with the exterior of the tube within which a low temperature will be consequently maintained.

In the modified construction of refrigerating machine shown in Figs. 2 and 3 the passage through which the liquid to be frozen passes, and also the screw conveyer 10' to work therein, are of annular form and arranged externally to the refrigerating vessel 1. The said passage is formed by a tubular casing 5$^a$ that is carried by a suitable frame 21 and has an inlet with feeding hopper 8 at the top and an outlet at the bottom, that can be closed at starting, with a perforated cap or cover 9 for the purpose hereinbefore stated. The screw blade 10', constituting the screw conveyer, is in this example connected to and driven by a bevel wheel 22 that is carried by a ball or other bearing 22$^a$ and is in gear with another bevel wheel 23 fixed upon a driving shaft 24 provided with a crank handle 25. The freezing vessel 1, which has a charging opening at the top, has fixed to it a stirrup 26 from which projects a cylindrical extension 27 with collar 28 by means of which the vessel is pivotally suspended from another stirrup 29 the ends of which are loosely mounted on the driving shaft 24.

30 is a bevel wheel fixed upon the extension 27 and in gear with a bevel toothed pinion 31 fixed on the driving shaft. By this arrangement it will be seen that if the driving shaft be rotated, the vessel 1 and screw conveyer 10 will be driven independently of each other and at different speeds as in the arrangement first herein described.

In the modified construction shown in Fig. 4 the screw conveyer 10$^2$ is fixed to the interior of the casing 5$^a$ which, in this case, is fixed to the bevel wheel 22 and mounted to rotate within the frame 21, its lower end 5$^b$ being arranged to rotate in the lower conical part 5$^c$ which is fixed.

The casing 5 in each of the arrangements shown in Figs. 2 to 4 inclusive may advantageously be provided with a cooling jacket, or be coated with a non-conductor of heat as indicated in dotted lines at 5$^b$ in Fig. 4.

As will be obvious machines constructed with an external screw conveyer, like those illustrated in Figs. 2 to 4 inclusive, may by suitable modifications be arranged to work horizontally like that shown in Fig. 1 instead of vertically as shown.

What I claim is—

1. A refrigerating machine comprising a rotary vessel to contain the freezing agent, a passage cooled thereby and having inlet and outlet openings a screw conveyer located within and of approximately the same cross sectional area as said passage and means for rotating said vessel and screw propeller substantially as herein described for the purpose specified.

2. A refrigerating machine comprising a rotary vessel to contain the freezing agent, a passage arranged to be cooled by the contents of said vessel, and a removable screw conveyer located within and approximately of the same cross-sectional area as said passage substantially as herein described for the purpose specified.

3. In a refrigerating machine the combination of a rotary vessel to contain a freezing agent, a tube extending centrally therethrough and provided with inlet and outlet apertures, a screw conveyer located in said tube and mechanism for rotating said vessel and screw conveyer substantially as herein described.

4. In a refrigerating machine, the combination of a rotary vessel to contain a freezing agent, a tube extending centrally therethrough provided with supply and discharge openings and about which said vessel can rotate, standards wherein said tube is fixed, a screw conveyer located in said tube and mechanism for independently rotating said vessel and screw propeller substantially as herein described for the purpose specified.

5. In a refrigerating machine, the combination of a rotary vessel to contain a freezing agent, means for rotating said vessel, a tube extending centrally therethrough and having supply and discharge openings, a screw conveyer located in said tube and provided with a screw threaded extension, a driving wheel mounted on said extension and having a boss arranged to close one end of the passage way through said tube and formed with a transverse slot in which the end of said screw conveyer is fitted, and a fastening device such as a nut for securing said screw conveyer and driving wheel together substantially as herein described for the purpose specified.

In testimony whereof I have signed my name to this specification in the presence of two subscribing witnesses.

JOSEPH WILFRED BOWLEY.

Witnesses:
F. J. BROUGHAM,
  46 *Lincoln's Inn Field, London.*
C. E. BROUGHAM,
  46 *Lincoln's Inn Field, London, W. C.*